J. P. CHAMPION.
Horse Stock.
No. 70,523.
Patented Nov. 5, 1867.
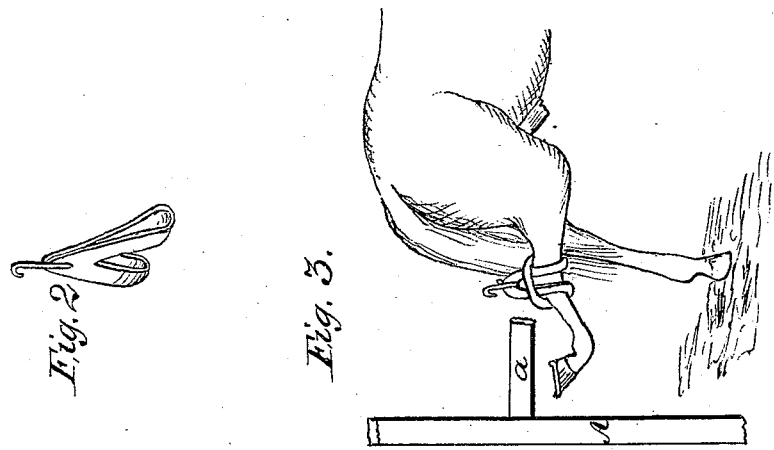
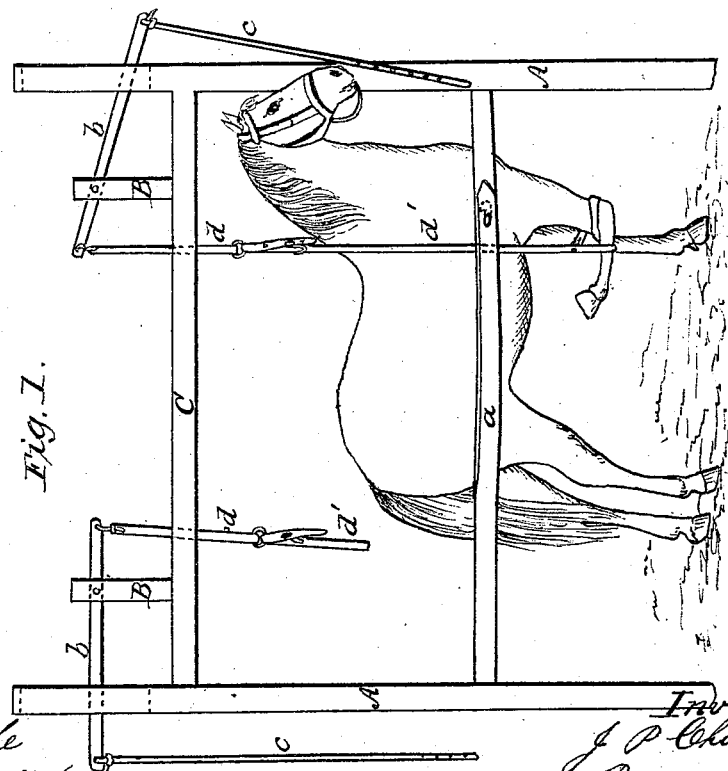

United States Patent Office.

J. P. CHAMPION, OF PHELPS, NEW YORK.

Letters Patent No. 70,523, dated November 5, 1867.

IMPROVEMENT IN APPARATUS FOR RAISING AND SECURING THE LEGS OF HORSES TO SHOE THEM.

The Schedule referred to in these Letters Patent and making part of the same.

TO ALL WHOM IT MAY CONCERN:

Be it known that I, J. P. CHAMPION, of Phelps, in the county of Ontario, and State of New York, have invented a new and improved Apparatus for Raising and Securing the Legs of Horses to Shoe them; and I do hereby declare that the following is a full, clear, and exact description thereof, which will enable those skilled in the art to make and use the same, reference being had to the accompanying drawings, forming part of this specification, in which—

Figure 1 is a side view of my improved apparatus for raising and securing the legs of horses to shoe them.

Figure 2 is a detached view of a modified form of loop-strap for the purpose.

Figure 3 is a detached view of another modified form of a slip-noose strap for the same purpose.

Similar letters of reference indicate corresponding parts.

The object of this invention is to raise and secure the leg of a horse in order to shoe or otherwise handle him safely with impunity; and it consists of an apparatus, formed of straps and levers attached to a frame, so arranged that a horse may be kept in position and have one leg at a time lifted from the ground and held in a bent position securely.

A A represent four posts, so placed in corners relatively to each other as to form an oblong frame for enclosing the horse by means of straps $a$ running from post to post at the sides, as shown in the drawing. Near the upper part of each post is attached a lever, $b$, to a stud or short post, B, on the side rail C, on the end of which is fastened a strap or cord, $c$, and on the other end a strap, $d$, to which is buckled another long strap, $d'$, which may be lengthened or shortened, as required. The strap $d'$ is passed once around either leg of a horse, above the knee, and once around below the knee, as shown in the drawing, and the end of the strap is then fastened to itself by hooking into the part above the knee. To raise the leg, the lever $b$ is drawn down by the strap $c$, and when raised to the proper height the leg is secured by fastening the strap $c$ to a pin at the side of the post. Instead of the strap $d'$ a loop, shown by fig. 2, or a slip-noose, shown by fig. 3, may be placed around the leg of the horse, and the loop or slip-noose being attached to the strap $d$ on the lever, the leg may be lifted and secured by either of them.

Having thus described my invention, what I claim as new, and desire to secure by Letters Patent, is—

The apparatus for raising and securing the legs of horses to shoe them safely, arranged and applied as herein shown and described.

J. P. CHAMPION.

Witnesses:
JOHN T. GIFFORD,
JOSHUA W. THOMPSON.